(12) United States Patent
Roskind

(10) Patent No.: US 7,043,606 B2
(45) Date of Patent: May 9, 2006

(54) AUTOMATIC BROWSER WEB CACHE RESIZING SYSTEM

(75) Inventor: James Roskind, Redwood City, CA (US)

(73) Assignee: America Online, Inc., Dulles, VA (US)

( * ) Notice: Subject to any disclaimer, the term of this patent is extended or adjusted under 35 U.S.C. 154(b) by 477 days.

(21) Appl. No.: 10/262,110

(22) Filed: Oct. 1, 2002

(65) Prior Publication Data

US 2004/0064642 A1 Apr. 1, 2004

(51) Int. Cl.
*G06F 12/06* (2006.01)

(52) U.S. Cl. .................. 711/118; 711/171; 711/172; 709/228; 709/229; 710/56

(58) Field of Classification Search .............. 711/170, 711/171, 118; 709/228, 229; 710/56
See application file for complete search history.

(56) References Cited

U.S. PATENT DOCUMENTS

| | | | | |
|---|---|---|---|---|
| 6,175,862 | B1 * | 1/2001 | Chen et al. | 709/218 |
| 6,510,458 | B1 * | 1/2003 | Berstis et al. | 709/219 |
| 6,691,176 | B1 * | 2/2004 | Narin et al. | 719/318 |
| 6,715,056 | B1 * | 3/2004 | Amro et al. | 711/171 |
| 6,728,763 | B1 * | 4/2004 | Chen | 709/219 |
| 6,763,376 | B1 * | 7/2004 | Devine et al. | 709/223 |
| 2003/0009562 | A1 * | 1/2003 | Heymann et al. | 709/227 |
| 2003/0211447 | A1 * | 11/2003 | Diesel et al. | 434/118 |

\* cited by examiner

*Primary Examiner*—Pierre-Michel Bataille
(74) *Attorney, Agent, or Firm*—Michael A. Glenn; Glenn Patent Group

(57) ABSTRACT

An automatic browser Web cache resizing system allows a browser to adjust its Web cache size to its environment automatically. When the browser starts up, the browser examines the host computer's hard drive for the amount of the available free space and allocates the maximum reasonable amount of the free space on the hard drive for the Web cache that it needs to run efficiently. During the browser's shutdown sequence, it optionally reexamines the free space on the hard drive and gives up as much of its allocated Web cache space as it can. Every time the browser writes to or reads from the Web cache, the browser checks to see if its Web cache allocation is needed for free space. If the browser sees that the amount of free space is low, it will give up some of its Web cache space that it allocated. Another preferred embodiment of the invention integrates the invention with the operating system of the host computer. The browser requests memory from the operating system. The browser can designate the allocated memory as not being critical and can be recovered by the operating system if the operating system needs part or all of the memory. The browser can optionally designate that a part of the memory allocation request is critical and the remainder is not critical.

118 Claims, 7 Drawing Sheets

AUTOMATIC BROWSER WEB CACHE RESIZING SYSTEM

BACKGROUND OF THE INVENTION

1. Technical Field

The invention relates to the setting of Web browser operating parameters. More particularly, the invention relates to intelligently adjusting a Web browser's Web cache allocation to fit the browser's operating environment.

2. Description of the Prior Art

Web browsers have become a standard application for the majority of personal computers in the world today. The original concept for the Web browsers was that the typical user needed to have a browsing experience that was as trouble free as possible. The typical user does not want and does not need to know anything more about the browser's operations than entering Universal Resource Locators (URL) into the browser's location or address fields.

However, the reality of the personal computer world is that the majority of application programs require that the user or the installer have knowledge of the specific system that the programs are installed on. For example, the Apple Computer Incorporated Mac systems using Mac OS 9 require that the user or installer properly set the memory requirements for application programs depending on their expected use and available memory.

A Web browser requires the use of the host computer's hard drive for temporary caching of content (Web cache). The browser uses the Web cache area reserved on the computer's hard drive to store Web page content (e.g., HTML pages, JPEG and GIF images, etc.). Web page content is stored in the Web cache area for quick access to recently visited Web pages. This speeds up the user's Web experience by skipping the step of waiting for a remote server to produce content that the browser already has stored in its Web cache. The user has a better Web experience because of the Web cache.

However, Web browsers require that the size of the Web cache be specified manually. The Web browser manufacturers set the Web cache size at the time of release to a value that they believe will suffice for the majority of users.

Referring to FIG. 1, Microsoft Corporation's Internet Explorer has a preference window 101 where the Web cache value is set to a default value of 10 MB 102. The preference window 101 allows the user to modify the Web cache value 102 as he sees fit. The typical user has no idea what the Web cache does for him, nor does he know how changing the Web cache value 102 will affect him.

With respect to FIG. 2, Netscape Communication Corporation's, Netscape Navigator provides a similar preference window 201. The browser's Web cache size is set to 7.6 MB as a default value 202 and is also modifiable by the user.

It would be advantageous to provide an automatic browser Web cache resizing system that dynamically sets the Web cache value for a browser. It would further be advantageous to provide an automatic browser Web cache resizing system that automatically adapts the Web cache size to the host computer's memory constraints.

SUMMARY OF THE INVENTION

The invention provides an automatic browser Web cache resizing system. The system dynamically adjusts the Web cache size for a browser. In addition, the invention automatically adapts the browser's Web cache size to the host computer's memory constraints.

A preferred embodiment of the invention allows a browser to adjust its Web cache size to its environment automatically. When the browser starts up, the browser examines the host computer's hard drive for the amount of the available free space. The browser then allocates the maximum reasonable amount of the free space on the hard drive for the Web cache that it needs to run efficiently.

During the browser's shutdown sequence, it optionally reexamines the free space on the hard drive and gives up as much of its allocated Web cache space as it can to give the user and other application programs more space to use in its absence.

In a more advanced preferred embodiment of the invention, every time the browser writes to or reads from the Web cache, the browser checks to see if its Web cache allocation has gotten in the way of the user or other application programs. If the browser sees that the amount of free space is low, it will give up some of its Web cache space that it allocated.

The user is allowed to select an option in the browser's preferences window that enables/disables automatic sizing of the browser's Web cache on startup.

Another preferred embodiment of the invention integrates the invention with the operating system of the host computer. At startup, the browser requests memory from the operating system which allocates memory from the host computer's storage device. The browser can designate the allocated memory as not being critical and can be recovered by the operating system if the operating system needs part or all of the memory for other tasks or application programs when the amount of free space gets low or is depleted. The browser can optionally designate that a part of the memory allocation request is critical and the remainder is not critical.

The operating system notifies the browser that it has taken back memory and the amount recovered. When the browser sees that the operating system has notified it that a certain portion of its Web cache was reallocated, the browser adjusts its Web cache lookup table to the new Web cache size.

Yet another preferred embodiment of the invention dynamically allocates the browser's Web cache as the browser is operating. The browser manipulates its Web cache size while it is being used by the user. As the user increases/decreases his browser usage, the browser allocates/deallocates more memory for the Web cache to keep its performance consistent.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in an automatic browser Web cache resizing system. A system according to the invention dynamically adjusts the Web cache size for a browser. In addition, the invention automatically adapts the browser's Web cache size to the host computer's memory constraints.

The invention provides a dynamically adaptive system that sets a browser's Web cache size automatically. The invention analyzes the host computer's hard drive and available memory on the hard drive to set the Web cache size to a value that offers a user the maximal benefit given the host computer's memory constraints.

A Web browser requires the use of the host computer's hard drive for temporary caching of content (Web cache). The Web cache area is generally static, meaning the Web cache area resides on the host computer's hard drive as a folder containing files that, when the Web cache is fully utilized, occupy the entire Web cache area. The browser uses the Web cache area reserved on the computer's hard drive to store Web page content (e.g., HTML pages, JPEG and GIF images, etc.). The Web page content is stored in the Web cache area for quick access to recently visited Web pages.

The browser speeds up the user's Web experience by skipping the time-consuming task of waiting for a remote server to produce content that the browser already has stored in its Web cache. The user feels that his Web response time is faster and has a better Web experience.

Figure 1:
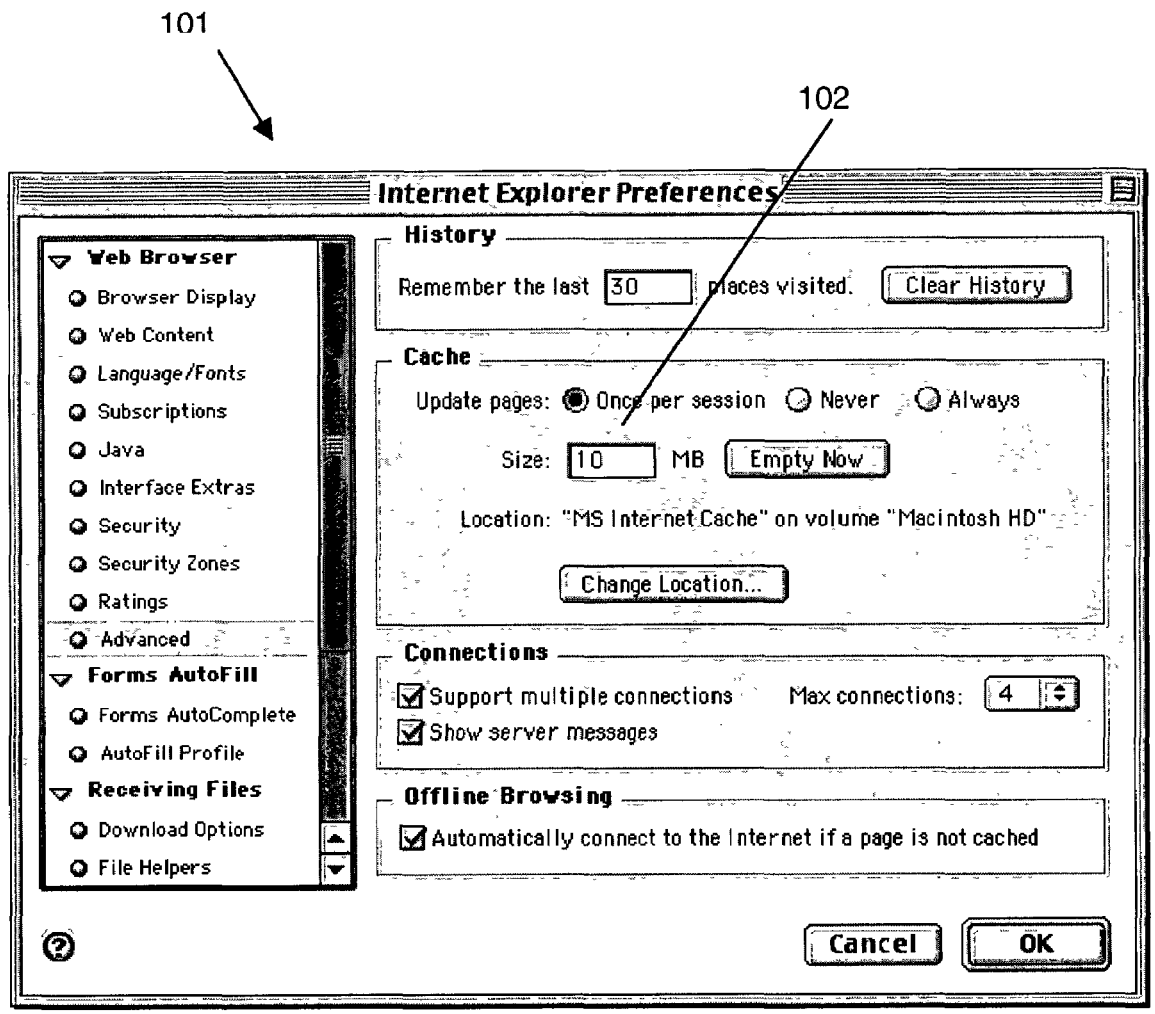
FIG. 1 is a diagram of a prior art approach of manually setting a browser's Web cache size according to the invention.
Figure 2:
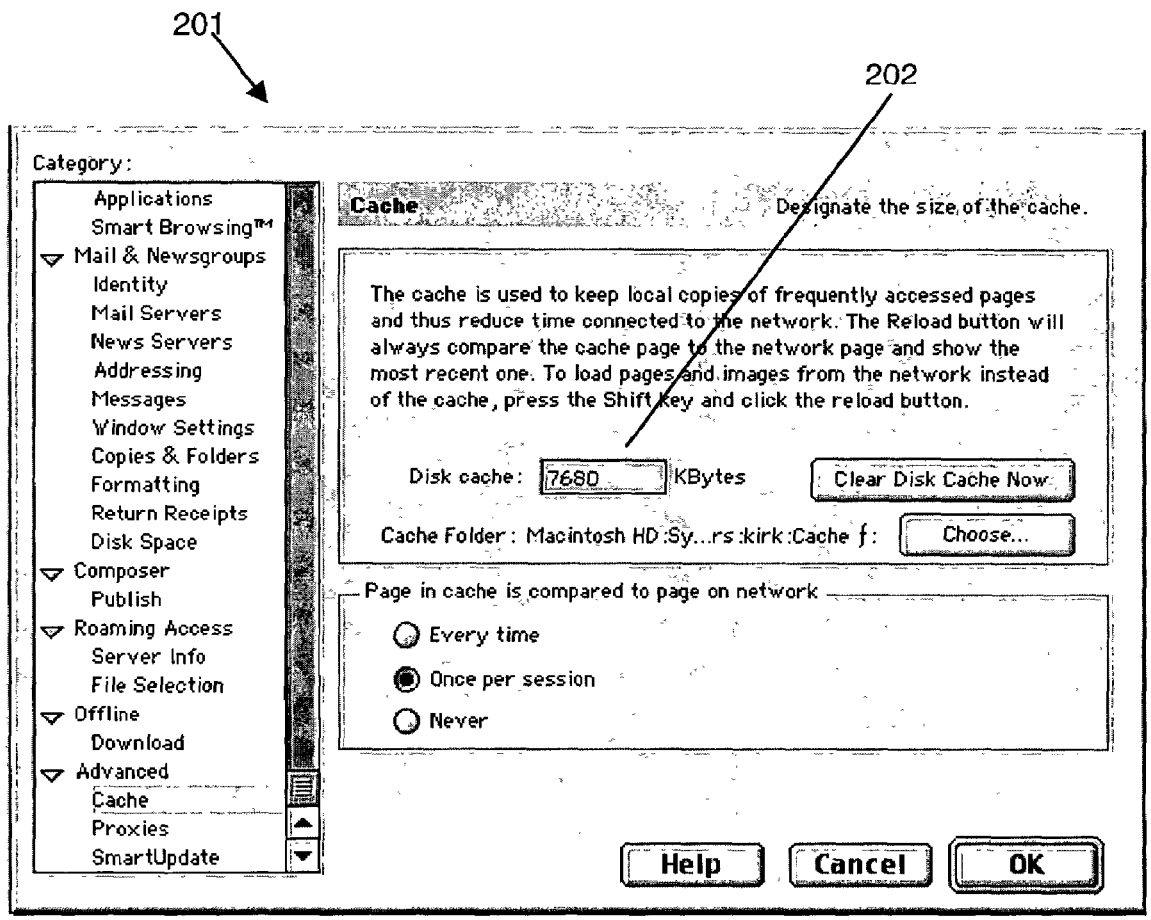
FIG. 2 is a diagram of a prior art approach of manually setting a browser's Web cache size according to the invention.

Referring again to FIGS. 1 and 2, a default Web cache size is set by manufacturer such as in Microsoft Corporation's Internet Explorer's preference window 101 and Netscape Communication Corporation's, Netscape Navigator's preference window 201. The purpose and use of the Web cache is beyond the typical user's grasp. Therefore, the typical user will never enter another value in his browser's Web cache entry area 102, 202. This means that the user's browser is not given the chance to perform at its maximal performance levels for the user's particular computer.

There are times when a technologically savvy user will reduce his Web browser's cache space to recover some memory from his hard drive when his computer starts to run out of space on its hard drive. However, the user must have the technical knowledge to understand the ramifications of such a change. The typical user does not have the background to even contemplate what is happening on a computer's hard drive.

The invention allows the browser to adjust its Web cache size to its environment automatically. The invention looks at the host computer's hard drive and analyzes the amount of free space available on the hard drive. The browser will attempt to allocate the maximum portion possible of the free space on the hard drive.

Figure 3:
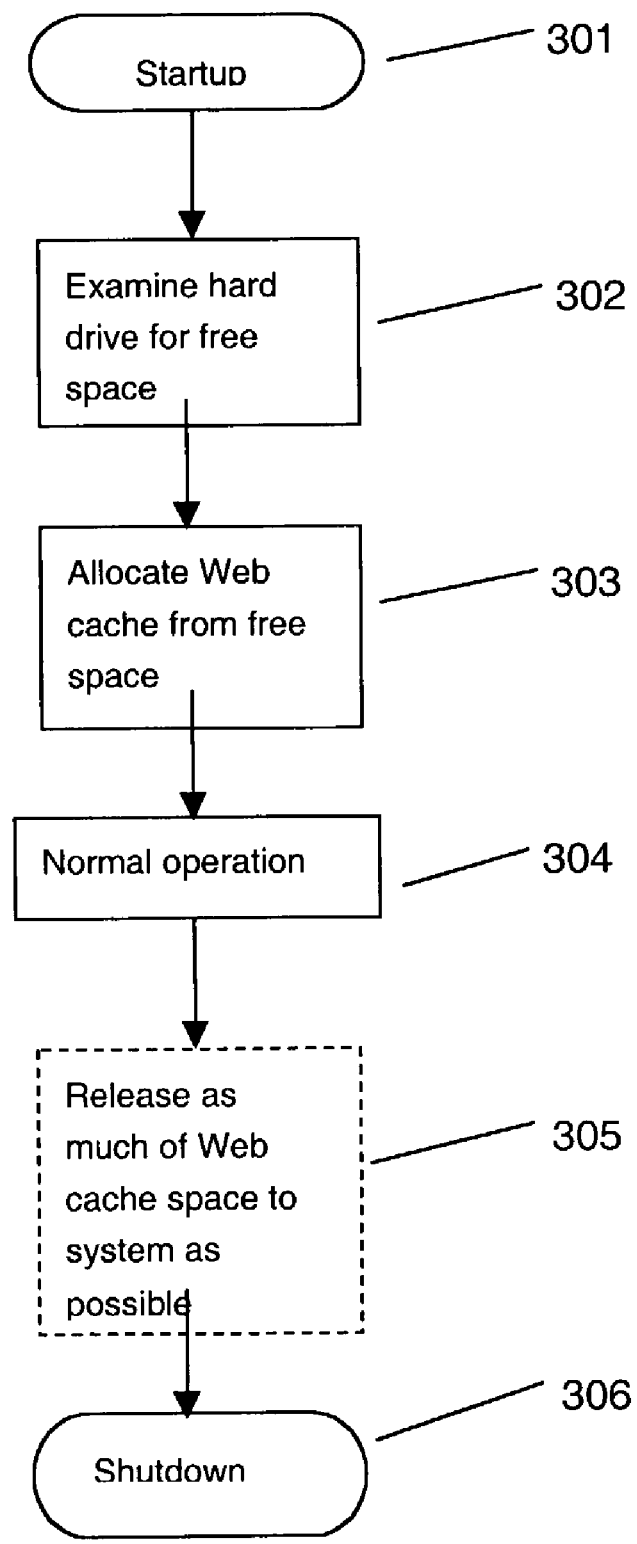
FIG. 3 is a block schematic diagram of a flowchart for a preferred embodiment of the invention automatically allocating memory for a browser's Web cache according to the invention.
Figure 4:
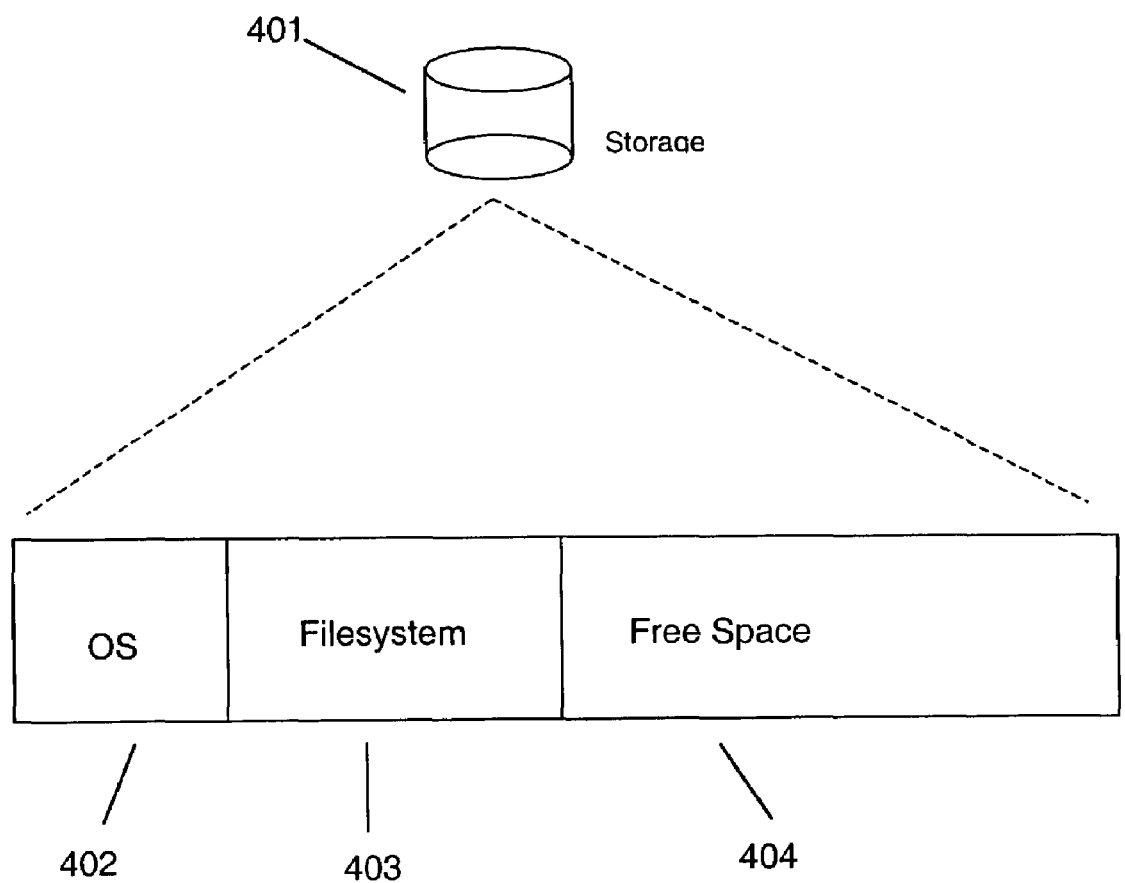
FIG. 4 is a block schematic diagram showing the partitioning of a host computer's storage device according to the invention.

With respect to FIGS. 3 and 4, using the invention's basic approach, when the browser starts up 301, the browser examines the hard drive for the amount of the available free space 302. The hard drive 401 typically has a certain amount of space reserved for the operating system 402, the file system 403, and the remaining space 404, which is deemed free space. The browser then allocates (requests from the operating system) the maximum reasonable amount of the free space on the hard drive for the Web cache that it needs to run efficiently 303. For example, the browser can allocate a percentage of the free space.

The browser then operates normally 304. When the browser shuts down, it optionally reexamines the free space on the hard drive and gives up as much of its allocated Web cache space as it can to give the user and other application programs more space to use in its absence 305, before actually shutting down 306.

Figure 5:
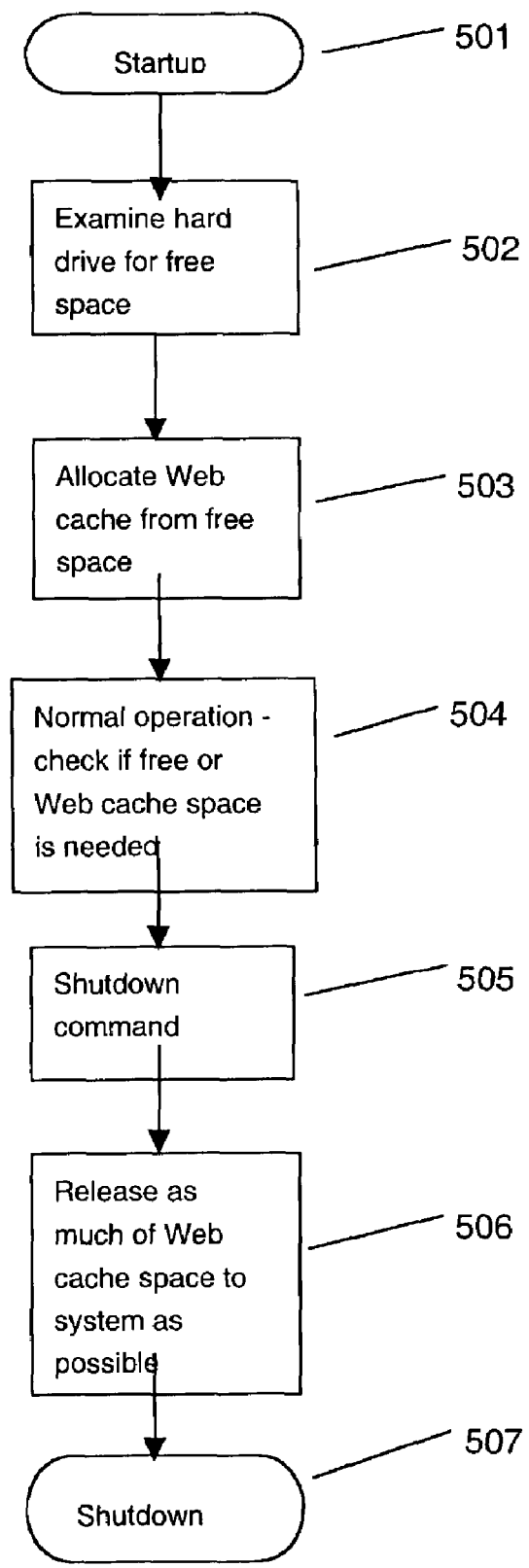
FIG. 5 is a block schematic diagram of a flowchart for another preferred embodiment of the invention dynamically adjusting a browser's Web cache during runtime according to the invention.

With respect to FIG. 5, in a more advanced embodiment of the invention, whenever the browser starts up 501, the browser examines the hard drive for the amount of the available free space 502. As above, the browser then allocates (requests from the operating system) the maximum reasonable amount of the free space on the hard drive for the Web cache that it needs to run efficiently 503.

Every time the browser writes to or reads from the Web cache, it checks to see if its Web cache allocation has gotten in the way of the user or other application programs 504. If it sees that the amount of free space has gotten dangerously small, it will give up some of its Web cache space that it allocated 504. This allows the browser to coexist with the user and other application programs. The browser can also allocate more memory to its Web cache during normal runtime to improve its performance 504.

When the browser shuts downs 505, it reexamines the free space on the hard drive and gives up as much of its allocated Web cache space back to the free space as it can, to give the user and other application programs more space to use in its absence 506. The browser then shuts down 507.

Figure 6:
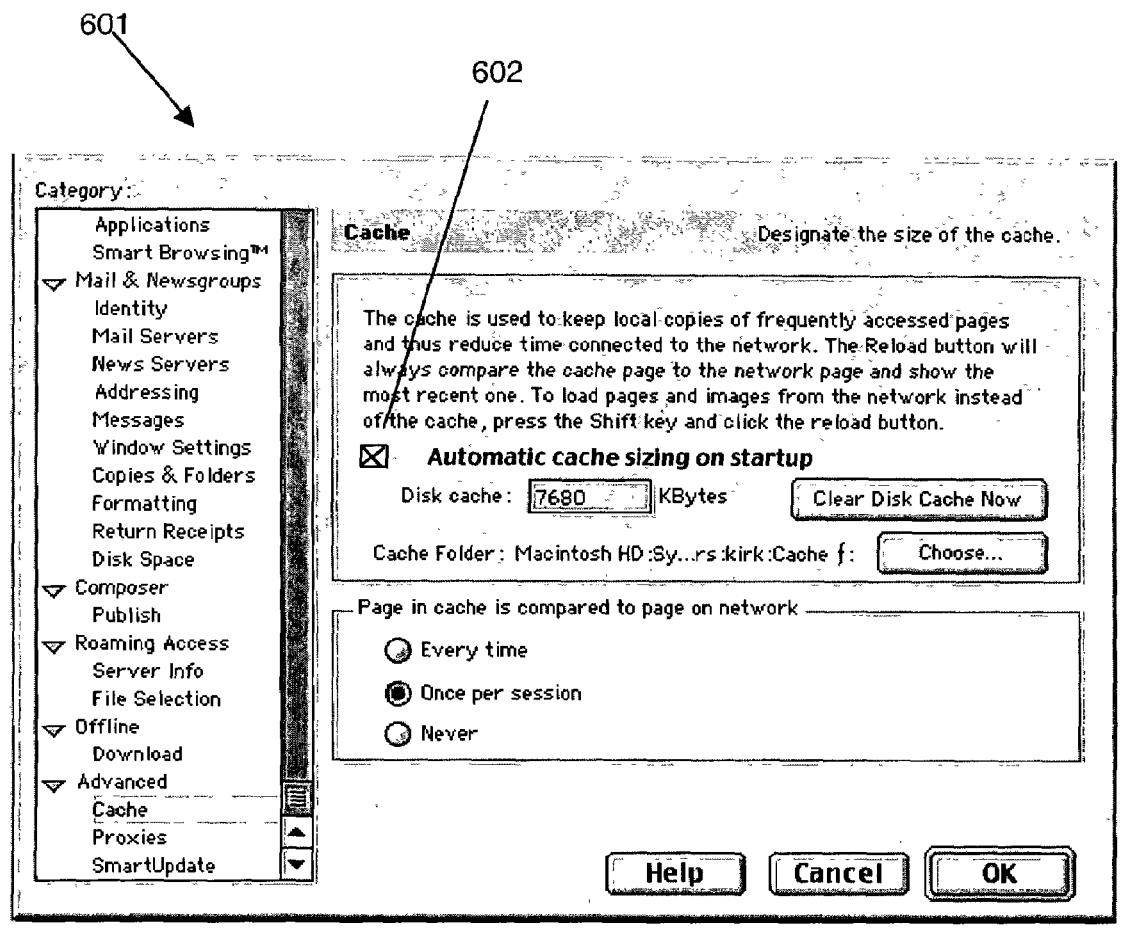
FIG. 6 is a diagram of a preferred embodiment of the invention's user interface allowing a user to select between automatically or manually setting a browser's Web cache size according to the invention.

Referring to FIG. 6, the user can also be allowed to select an option in the browser's preferences window 601 that lets the browser automatically size its Web cache on startup 602. This gives the user the ability to manually customize his Web cache size, as with prior browsers, by disabling the automatic cache sizing option.

Figure 7:
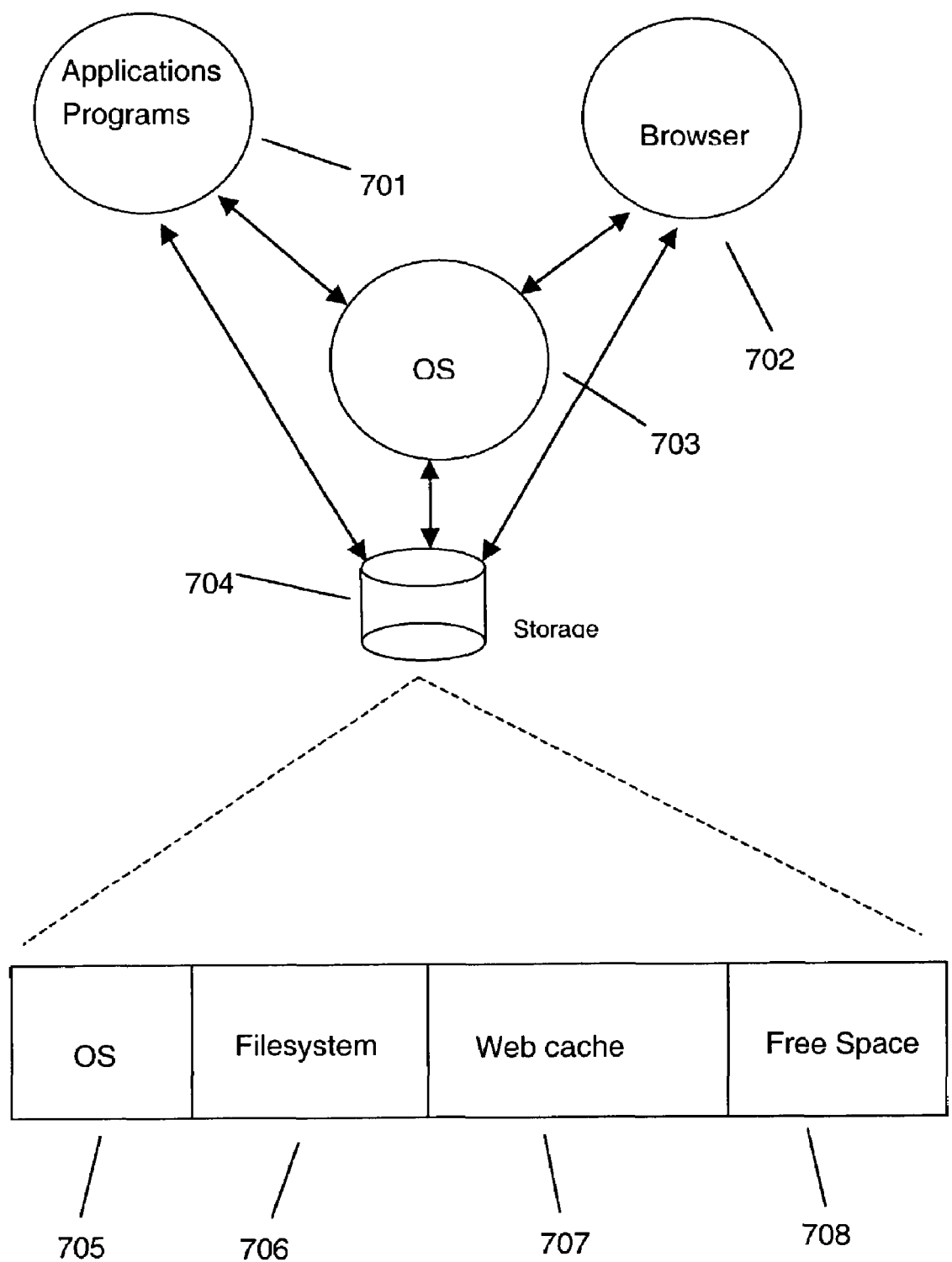
FIG. 7 is a block schematic diagram of the interaction of another preferred embodiment of the invention integrated into a host computer's operating system and browser according to the invention.

With respect to FIG. 7, another preferred embodiment of the invention integrates the invention with the operating system 703 of the host computer. At startup, the browser 702 requests memory from the operating system 703. The requested memory is allocated from the storage device 704 by the operating system 702. The browser 702 can designate the allocated memory as not being critical and can be recovered by the operating system 703 if it needs part or all of the memory for other tasks or application programs 701 when the amount of free space 708 gets low or is depleted. However, the operating system 703 must tell the browser 702 that it has taken back memory and how much. The browser 702 can optionally designate that a part of the memory allocation request is critical and the remainder is not critical, thereby allowing the browser 702 to retain a minimal amount of Web cache 707 to operate in.

The browser 702 knows that when it comes back to use its Web cache 707, that there is a possibility that part of the Web cache 707 may be missing. When the browser 702 sees that the operating system 703 has notified it that a certain portion of its Web cache 707 was reallocated, the browser 702 adjusts its Web cache lookup table (e.g., hash table) to the new Web cache size. For example, the Web content that was in the area of memory that was reallocated is removed from the lookup table.

Another preferred embodiment of the invention dynamically allocates the browser's Web cache 707 as the browser 702 is operating. The browser 702 can manipulate its Web cache size while it is being used by the user. As the user increases his browser usage, the browser 702 allocates more memory for the Web cache 707 to keep its performance consistent.

The browser 702 can also monitor the performance of its Web cache 707 by examining the amount of the Web cache 707 that is unused or used only once during a certain period of time. Using this information, the browser 702 releases Web cache space back to the operating system 703.

The invention can track multiple users' browsing habits and adjust its Web cache to a specific user's normal activity pattern. For example, some browsers maintain a separate Web cache for each user profile that has been created. Doing this improves the user's Web experience at startup. The invention can adjust each Web cache to each user profile.

Other browsers maintain a single Web cache that is used across each user session. Using this type of browser, the invention can adjust its Web cache at startup to the specific user that is logged on.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for automatically setting a browser's Web cache on a host computer, comprising the steps of:
    determining the amount of free space on said host computer's storage device during the startup of said browser;
    allocating a portion of said free space to said Web cache;
    determining the amount of free space on said host computer's storage device while shutting down said browser; and
    releasing a portion of said Web cache's space back to said free space.

2. The process of claim 1, wherein said allocating step allocates a percentage of said free space.

3. The process of claim 1, further comprising the step of:
    monitoring said free space each time said browser writes to or reads from said Web cache to check if said free space requires additional memory.

4. The process of claim 3, wherein if said monitoring step sees that said free space requires additional memory, said monitoring step releases a portion of said Web cache space to said free space.

5. The process of claim 1, further comprising the step of:
    providing preference setting means for allowing a user to select an option that enables or disables said allocating step on startup.

6. The process of claim 1, further comprising the step of:
    providing an operating system on said host computer.

7. The process of claim 6, wherein said allocating step requests memory from said free space from said operating system to assign to said Web cache, and wherein said operating system allocates memory from said free space to said allocating step.

8. The process of claim 7, wherein said allocating step designates said requested memory as not being critical and wherein said requested memory can be recovered by said operating system if said operating system needs part or all of said requested memory for other tasks or application programs during normal runtime of said browser.

9. The process of claim 8, wherein said operating system notifies said browser that it has recovered an amount of memory from said requested memory.

10. The process of claim 7, wherein said allocating step designates that a portion of said requested memory is critical and the remainder is not critical.

11. The process of claim 9, wherein when said browser sees that said operating system has notified it that a certain portion of its requested memory was reallocated and a new Web cache size exists, said browser adjusts its Web cache lookup table to the new Web cache size.

12. The process of claim 11, wherein any Web content that was in the area of memory that was reallocated by said operating system is removed from said Web cache lookup table.

13. The process of claim 11, wherein said Web cache lookup table is a hash table.

14. The process of claim 1, further comprising the step of:
    dynamically allocating space to said Web cache from said free space as said browser is operating.

15. The process of claim 14, wherein as a user increases his browser usage, said dynamically allocating step allocates more memory for said Web cache.

16. The process of claim 14, wherein as a user decreases his browser usage, said dynamically allocating step releases unneeded memory from said Web cache to said free space.

17. The process of claim 1, further comprising the step of:
    monitoring the performance of said Web cache by examining the amount of said Web cache that is unused or used only once during a certain period of time.

18. The process of claim 17, wherein said performance monitoring step releases a portion of Web cache space back to said free space if an unacceptable amount of Web cache space is unused or is only used once during said certain period of time.

19. The process of claim 1, further comprising the step of:
    tracking a user's browsing habits and adjusting said Web cache's size to the user's normal activity pattern.

20. The process of claim 19, further comprising the step of:
    storing a plurality of users' browsing habits in separate user profiles; and
    wherein said tracking step allocates and adjusts a Web cache for each user profile.

21. A process for automatically setting a browser's Web cache on a host computer having a storage device, comprising the steps of:
    automatically examining said host computer's storage device during the startup of said browser to determine the amount of available free space on said computer's storage device; and
    automatically allocating a portion of said determined available free space to said Web cache during startup and before normal runtime of said browser.

22. The process of claim 21, further comprising the steps of:
    determining the amount of available free space on said host computer's storage device while shutting down said browser; and
    releasing a portion of said Web cache's space back to said available free space.

23. The process of claim 21, wherein said allocation step allocates a percentage of said available free space.

24. The process of claim 21, further comprising the step of:
  monitoring said available free space each time said browser writes to or reads from said Web cache to check if said available free space requires additional memory.

25. The process of claim 24, wherein if said monitoring step sees that said available free space requires additional memory, said monitoring step releases a portion of said Web cache space to said available free space.

26. The process of claim 21, further comprising the step of:
  providing preference setting means for allowing a user to select an option that enables or disables said allocating step on startup.

27. The process of claim 21, further comprising the step of:
  providing an operating system on said host computer.

28. The process of claim 27, wherein said allocation step requests memory from said available free space from said operating system to assign to said Web cache, and wherein said operating system allocates memory from said available free space.

29. The process of claim 28, wherein said allocation step designates said requested memory as not being critical and wherein said requested memory can be recovered by said operating system if said operating system needs part or all of said requested memory for other tasks or application programs during normal runtime of said browser.

30. The process of claim 29, wherein said operating system notifies said browser that it has recovered an amount of memory from said requested memory.

31. The process of claim 28, wherein said allocation step designates that a portion of said requested memory is critical and the remainder is not critical.

32. The process of claim 30, wherein when said browser sees that said operating system has notified it that a certain portion of its requested memory was reallocated and a new Web cache size exists, said browser adjusts its Web cache lookup table to the new Web cache size.

33. The process of claim 32, wherein any Web content that was in the area of memory that was reallocated by said operating system is removed from said Web cache lookup table.

34. The process of claim 32, wherein said Web cache lookup table is a hash table.

35. A process for automatically setting a browser's Web cache on a host computer, comprising the steps of:
  providing free space determination means in said browser for determining the amount of available free space on said host computer's storage device during the startup of said browser;
  providing Web cache allocation means in said browser for allocating a portion of said available free space to said Web cache before normal runtime of said browser; and
  monitoring the performance of said Web cache by examining the amount of said Web cache that is unused or used only once during a certain period of time.

36. The process of claim 35, further comprising the steps of:
  determining the amount of available free space on said host computer's storage device while shutting down said browser; and
  releasing a portion of said Web cache's space back to said available free space.

37. The process of claim 35, wherein said Web cache allocation means allocates a percentage of said available free space.

38. The process of claim 35, further comprising the step of:
  monitoring said available free space each time said browser writes to or reads from said Web cache to check if said available free space requires additional memory.

39. The process of claim 38, wherein if said monitoring step sees that said available free space requires additional memory, said monitoring step releases a portion of said Web cache space to said available free space.

40. The process of claim 35, further comprising the step of:
  providing preference setting means for allowing a user to select an option that enables or disables said allocating step on startup.

41. The process of claim 35, further comprising the step of:
  providing an operating system on said host computer.

42. The process of claim 41, wherein said Web cache allocation means requests memory from said available free space from said operating system to assign to said Web cache, and wherein said operating system allocates memory from said available free space to said Web cache allocation means.

43. The process of claim 42, wherein said Web cache allocation means provides any of:
  designating that a portion of said requested memory is critical and the remainder is not critical; and
  designating said requested memory as not being critical and wherein said requested memory can be recovered by said operating system if said operating system needs part or all of said requested memory for other tasks or application programs during normal runtime of said browser.

44. The process of claim 43, wherein said operating system notifies said browser that it has recovered an amount of memory from said requested memory.

45. The process of claim 44, wherein when said browser sees that said operating system has notified it that a certain portion of its requested memory was reallocated and a new Web cache size exists, said browser adjusts its Web cache lookup table to the new Web cache size.

46. The process of claim 45, wherein any Web content that was in the area of memory that was reallocated by said operating system is removed from said Web cache lookup table.

47. The process of claim 45, wherein said Web cache lookup table is a hash table.

48. The process of claim 21, further comprising the step of:
  dynamically allocating space to said Web cache from said available free space as said browser is operating.

49. The process of claim 48, wherein as a user increases his browser usage, said dynamically allocating step allocates more memory for said Web cache.

50. The process of claim 48, wherein as a user decreases his browser usage, said dynamically allocating step releases unneeded memory from said Web cache to said available free space.

51. The process of claim 21, further comprising the step of:
  monitoring the performance of said Web cache by examining the amount of said Web cache that is unused or used only once during a certain period of time.

52. The process of claim 51, wherein said performance monitoring step releases a portion of Web cache space back to said available free space if an unacceptable amount of Web cache space is unused or is only used once during said certain period of time.

53. The process of claim 21, further comprising the step of:
tracking a user's browsing habits and adjusting said Web cache's size to the user's normal activity pattern.

54. The process of claim 53, further comprising the step of:
storing a plurality of users' browsing habits in separate user profiles; and
wherein said tracking step allocates and adjusts a Web cache for each user profile.

55. A program storage medium readable by a computer, tangibly embodying a program of instructions executable by the computer to perform method steps for automatically setting a browser's Web cache on a host computer, comprising the steps of:
determining the amount of free space on said host computer's storage device during the startup of said browser;
allocating a portion of said free space to said Web cache;
determining the amount of free space on said host computer's storage device while shutting down said browser; and
releasing a portion of said Web cache's space back to said free space.

56. The method of claim 55, wherein said allocating step allocates a percentage of said free space.

57. The method of claim 55, further comprising the step of:
monitoring said free space each time said browser writes to or reads from said Web cache to check if said free space requires additional memory.

58. The method of claim 57, wherein if said monitoring step sees that said free space requires additional memory, said monitoring step releases a portion of said Web cache space to said free space.

59. The method of claim 55, further comprising the step of:
providing preference selling means for allowing a user to select an option that enables or disables said allocating step on startup.

60. The method of claim 55, further comprising the step of:
providing an operating system on said host computer.

61. The method of claim 60, wherein said allocating step requests memory from said free space from said operating system to assign to said Web cache, and wherein said operating system allocates memory from said free space to said allocating step.

62. The method of claim 61, wherein said allocating step designates said requested memory as not being critical and wherein said requested memory can be recovered by said operating system if said operating system needs part or all of said requested memory for other tasks or application programs during normal runtime of said browser.

63. The method of claim 62, wherein said operating system notifies said browser that it has recovered an amount of memory from said requested memory.

64. The method of claim 61, wherein said allocating step designates that a portion of said requested memory is critical and the remainder is not critical.

65. The method of claim 63, wherein when said browser sees that said operating system has notified it that a certain portion of its requested memory was reallocated and a new Web cache size exists, said browser adjusts its Web cache lookup table to the new Web cache size.

66. The method of claim 65, wherein any Web content that was in the area of memory that was reallocated by said operating system is removed from said Web cache lookup table.

67. The method of claim 65, wherein said Web cache lookup table is a hash table.

68. The method of claim 55, further comprising the step of:
dynamically allocating space to said Web cache from said free space as said browser is operating.

69. The method of claim 68, wherein as a user increases his browser usage, said dynamically allocating step allocates more memory for said Web cache.

70. The method of claim 68, wherein as a user decreases his browser usage, said dynamically allocating step releases unneeded memory from said Web cache to said free space.

71. The method of claim 55, further comprising the step of:
monitoring the performance of said Web cache by examining the amount of said Web cache that is unused or used only once during a certain period of time.

72. The method of claim 71, wherein said performance monitoring step releases a portion of Web cache space back to said free space if an unacceptable amount of Web cache space is unused or is only used once during said certain period of time.

73. The method of claim 55, further comprising the step of:
tracking a user's browsing habits and adjusting said Web cache's size to the user's normal activity pattern.

74. The method of claim 73, further comprising the step of:
storing a plurality of users' browsing habits in separate user profiles; and
wherein said tracking step allocates and adjusts a Web cache for each user profile.

75. A program storage medium readable by a computer, tangibly embodying a program of instructions executable by the computer to perform method steps for automatically setting a Web cache of a browser on a host computer having a storage device, comprising the steps of:
automatically examining said host computer's storage device during the startup of said browser to determine the amount of available free space on said computer's storage device; and
automatically allocating a portion of said determined available free space to said Web cache during said startup and before normal runtime of said browser.

76. The method of claim 75, further comprising the steps of:
determining the amount of available free space on said host computer's storage device while shutting down said browser; and
releasing a portion of said Web cache's space back to said available free space.

77. The method of claim 75, wherein said allocation step allocates a percentage of said available free space.

78. The method of claim 75, further comprising the step of:
monitoring said available free space each time said browser writes to or reads from said Web cache to check if said available free space requires additional memory.

79. The method of claim 75, wherein if said monitoring step sees that said available free space requires additional memory, said monitoring step releases a portion of said Web cache space to said available free space.

80. The method of claim 75, further comprising the step of:
providing preference setting means for allowing a user to select an option that enables or disables said allocating step on startup.

81. The method of claim 75, further comprising the step of:
providing an operating system on said host computer.

82. The method of claim 81, wherein said allocation step requests memory from said available free space from said operating system to assign to said Web cache, and wherein said operating system allocates memory from said available free space.

83. The method of claim 82, wherein said allocation step designates said requested memory as not being critical and wherein said requested memory can be recovered by said operating system if said operating system needs part or all of said requested memory for other tasks or application programs during normal runtime of said browser.

84. The method of claim 83, wherein said operating system notifies said browser that it has recovered an amount of memory from said requested memory.

85. The method of claim 82, wherein said allocation step designates that a portion of said requested memory is critical and the remainder is not critical.

86. The method of claim 84, wherein when said browser sees that said operating system has notified it that a certain portion of its requested memory was reallocated and a new Web cache size exists, said browser adjusts its Web cache lookup table to the new Web cache size.

87. The method of claim 86, wherein any Web content that was in the area of memory that was reallocated by said operating system is removed from said Web cache lookup table.

88. The method of claim 86, wherein said Web cache lookup table is a hash table.

89. The method of claim 75, further comprising the step of:
dynamically allocating space to said Web cache from said available free space as said browser is operating.

90. The method of claim 89, wherein as a user increases his browser usage, said dynamically allocating step allocates more memory for said Web cache.

91. The method of claim 89, wherein as a user decreases his browser usage, said dynamically allocating step releases unneeded memory from said Web cache to said available free space.

92. The method of claim 75, further comprising the step of:
monitoring the performance of said Web cache by examining the amount of said Web cache that is unused or used only once during a certain period of time.

93. The method of claim 92, wherein said performance monitoring step releases a portion of Web cache space back to said available free space if an unacceptable amount of Web cache space is unused or is only used once during said certain period of time.

94. The method of claim 75, further comprising the step of:
tracking a user's browsing habits and adjusting said Web cache's size to the user's normal activity pattern.

95. The method of claim 94, further comprising the step of:
storing a plurality of users' browsing habits in separate user profiles; and
wherein said tracking step allocates and adjusts a Web cache for each user profile.

96. The process of claim 35, further comprising the step of:
dynamically allocating space to said Web cache from said available free space as said browser is operating.

97. The process of claim 96, wherein said dynamically allocating step provides any of:
allocating more memory for said Web cache as a user increases his browser usage; and
releasing unneeded memory from said Web cache to said available free space as a user decreases his browser usage.

98. The process of claim 35, wherein said performance monitoring step releases a portion of Web cache space back to said available free space if an unacceptable amount of Web cache space is unused or is only used once during said certain period of time.

99. The process of claim 35, further comprising the step of:
tracking a user's browsing habits and adjusting said Web cache's size to the user's normal activity pattern.

100. The process of claim 99, further comprising the step of:
storing a plurality of users' browsing habits in separate user profiles; and
wherein said tracking step allocates and adjusts a Web cache for each user profile.

101. A program storage medium readable by a computer, tangibly embodying a program of instructions executable by the computer to perform method steps for automatically setting a browser's Web cache on a host computer, comprising the steps of:
providing free space determination means in said browser for determining the amount of available free space on said host computer's storage device during the startup of said browser;
providing Web cache allocation means in said browser for allocating a portion of said available free space to said Web cache before normal runtime of said browser; and
monitoring the performance of said Web cache by examining the amount of said Web cache that is unused or used only once during a certain period of time.

102. The method of claim 101, further comprising the steps of:
determining the amount of available free space on said host computer's storage device while shutting down said browser; and
releasing a portion of said Web cache's space back to said available free space.

103. The method of claim 101, wherein said Web cache allocation means allocates a percentage of said available free space.

104. The method of claim 101, further comprising the step of:
monitoring said available free space each time said browser writes to or reads from said Web cache to check if said available free space requires additional memory.

105. The method of claim 104, wherein if said monitoring step sees that said available free space requires additional memory, said monitoring step releases a portion of said Web cache space to said available free space.

106. The method of claim 101, further comprising the step of:

providing preference setting means for allowing a user to select an option that enables or disables said allocating step on startup.

107. The method of claim 101, further comprising the step of:

providing an operating system on said host computer.

108. The method of claim 107, wherein said Web cache allocation means requests memory from said available free space from said operating system to assign to said Web cache, and wherein said operating system allocates memory from said available free space to said Web cache allocation means.

109. The method of claim 108, wherein said Web cache allocation means provides any of:

designating that a portion of said requested memory is critical and the remainder is not critical; and designating said requested memory as not being critical and wherein said requested memory can be recovered by said operating system if said operating system needs part or all of said requested memory for other tasks or application programs during normal runtime of said browser.

110. The method of claim 109, wherein said operating system notifies said browser that it has recovered an amount of memory from said requested memory.

111. The method of claim 110, wherein when said browser sees that said operating system has notified it that a certain portion of its requested memory was reallocated and a new Web cache size exists, said browser adjusts its Web cache lookup table to the new Web cache size.

112. The method of claim 111, wherein any Web content that was in the area of memory that was reallocated by said operating system is removed from said Web cache lookup table.

113. The method of claim 112, wherein said Web cache lookup table is a hash table.

114. The method of claim 101, further comprising the step of:

dynamically allocating space to said Web cache from said available free space as said browser is operating.

115. The method of claim 114, wherein said dynamically allocating step provides any of:

allocating more memory for said Web cache as a user increases browser usage; and releasing unneeded memory from said Web cache to said available free space as a user decreases browser usage.

116. The method of claim 101, wherein said performance monitoring step releases a portion of Web cache space back to said available free space if an unacceptable amount of Web cache space is unused or is only used once during said certain period of time.

117. The method of claim 101, further comprising the step of:

tracking a user's browsing habits and adjusting said Web cache's size to the user's normal activity pattern.

118. The method of claim 117, further comprising the step of:

storing a plurality of users' browsing habits in separate user profiles; and wherein said tracking step allocates and adjusts a Web cache for each user profile.

* * * * *